US005927090A

United States Patent [19]

Ladendorf et al.

[11] Patent Number: 5,927,090

[45] Date of Patent: Jul. 27, 1999

[54] CONDENSER AND RADIATOR AIR OUTLETS

[75] Inventors: Gerald J. Ladendorf, Bloomington; Rodney H. Volk, Eden Prairie, both of Minn.

[73] Assignee: Thermo King Corporation, Minneapolis, Minn.

[21] Appl. No.: 08/942,894

[22] Filed: Oct. 2, 1997

[51] Int. Cl.[6] .......... B60H 1/32

[52] U.S. Cl. .......... 62/239; 62/428; 296/181

[58] Field of Search .......... 62/239, 428, 429, 62/507; 296/181, 197

[56] References Cited

U.S. PATENT DOCUMENTS

| | | | |
|---|---|---|---|
| 4,365,484 | 12/1982 | Carson et al. | 62/239 |
| 4,527,400 | 7/1985 | Greenbeck et al. | 62/239 |
| 4,736,597 | 4/1988 | Anderson et al. | 62/239 |
| 4,956,978 | 9/1990 | Bleck et al. | 62/239 |
| 4,957,323 | 9/1990 | Johnson | 296/181 |
| 5,253,700 | 10/1993 | Early, Jr. | 62/239 |
| 5,557,938 | 9/1996 | Hanson et al. | 62/239 |
| 5,678,512 | 10/1997 | Colton | 62/239 |

*Primary Examiner*—William E. Tapolcai
*Attorney, Agent, or Firm*—Michael M. Gnibus

[57] ABSTRACT

A refrigerated mobile trailer is provided that includes a trailer body having an opening present in both its front wall and roof for receiving a transportable refrigeration unit. The refrigeration unit includes a housing having a roof panel and a side panel, a condenser assembly disposed within the housing that includes a condenser coil, an air inlet located in the side panel of the unit housing for receiving ambient air for circulation over the condenser coil and at least one air outlet for discharging circulated air to remove waste heat from the coil. The condenser coil is located adjacent to the roof panel of the refrigeration unit, and all air outlets for removing waste heat from the coil are advantageously located in the unit roof panel directly above the coil. The fact that all of the waste heat air outlets are located in the roof panel advantageously prevents air discharged from these outlets from recirculating back into the condenser air inlet when the mobile trailer is in a stationary position. Such a component arrangement also provides more useable space within the unit housing, which may be used to reduce the unit extension beyond the trailer front wall by 17%.

19 Claims, 8 Drawing Sheets

35 37 41 47 45 48 43 50 60 62b 62a 56b 52 54b 56a 54a 51 58 39

1
3
5
7
9
10
11
15
17
18
19a
19b
21a
21b
22
23a
23b
24

41
39
37
48
35
47
45
43
56a
54a
62a
60
50
52
62b
58
51
56b
54b

CONDENSER AND RADIATOR AIR OUTLETS

BACKGROUND OF THE INVENTION

This invention generally relates to refrigerated mobile trailers, and is specifically concerned with a refrigerated trailer having condenser and radiator air outlets disposed in its roof panel for preventing waste to heat from recirculating through the condenser and radiator air inlets.

Refrigerated mobile trailers are well known in the prior art. Such trailers typically comprise a rectangular trailer body adapted to be hauled by a tractor, and a transportable refrigeration unit mounted over an opening in the front wall of the trailer body. The refrigeration unit is often powered by its own diesel engine. In order to discharge the waste heat generated by both the condenser of the refrigeration unit and the radiator of the internal combustion engine, the housing of the refrigeration unit includes at least one air inlet in its side or front panel, and air outlets variously located in its floor panel, side panel, and roof panel. A blower is disposed within the housing of the refrigeration unit for withdrawing air from the air inlet, and forcefully circulating it over both the condenser coil and the radiator of the engine. The circulated air is discharged out of the air outlets located in the floor, side, and roof of the refrigeration unit housing, which in turn carries away the waste heat generated by these components.

While such a refrigerated trailer design has generally proven itself to be effective for its intended purposes, the applicants have noted that such a design may fail to maintain a desired set point temperature within the trailer body when the ambient temperature is 120° F. or higher. The applicants have further observed that such a failure is a result of two factors including (1) the lower high pressure cut-off temperature associated with newer, non-fluorocarbon refrigerants, and (2) the placement of the air outlet in the floor of the refrigeration unit housing.

It is well known that the cooling capacity of a refrigeration unit condenser is dependent upon the difference between the high pressure cut-off temperature of the refrigerant and the ambient temperature. Older fluorocarbon refrigerants, such as R-12 or R-502, had a high pressure cut-off temperature of 178° F. Accordingly, the difference between this temperature and maximum ambient temperatures was almost always greater than 50° F., thus providing substantial amount of condenser cooling capacity even when the ambient temperature reached very high levels on the order of 120° F. Unfortunately, the high pressure cut-off temperature of newer, non-fluorocarbon refrigerants such as R-404 is only 149° F., which substantially lowers the difference between the high pressure cut-off temperature and a possible ambient temperature of 120° F. to only about 29° F.

While such a 29° F. difference still results in a cooling capacity capable of maintaining most refrigeration set points, the applicants have noted that the second factor, i.e., the placement of the air outlet on the refrigeration unit, can artificially lower this difference to only 19° F. or less when the mobile trailer is stationary. Such conditions might arise when a loading or unloading operation is being conducted, or when the trailer is used to temporarily "warehouse" temperature sensitive goods. Under such circumstances, the column of hot air discharged from the floor-located air outlet is not laterally swept away (as it would be if the trailer were moving), but instead rises upward in a vertical direction, where it can be reintroduced into the side or front wall located air inlet of the refrigeration unit. Such undesirable recirculation of the hot air discharged from the air outlet can have the affect of artificially raising the temperature of the air surrounding the refrigeration unit 10° F. or higher, thereby dropping the difference between the high pressure cut-off temperature of the refrigerant and high ambient temperatures to (120° plus an additional 10°) 19° or less. With such a small difference between the high pressure cut-off temperature of 149° F. and the artificially high ambient temperature of 130° F., the condenser of the refrigeration unit cannot liquefy enough refrigerant for the expansion valve and evaporator assembly to maintain the refrigeration set point in the interior of the trailer. Under such conditions, prior art refrigerated trailers may be forced to operate at reduced capacities.

Clearly, there is a need for an improved refrigerated trailer design that is capable of maintaining refrigerated set point temperatures under all ambient air conditions, whether stationary or moving. Such a design must be compatible with the use of recently developed refrigerants, such as R-404, which do not relay upon atmosphere polluting fluoro or chlorocarbon compounds. Finally, it would be desirable if such a design was easily incorporated into existing trailers so that all the advantages of the design could be realized with only a minimal amount of structural modifications to existing trailers.

The foregoing illustrates limitations known to exist in present devices and methods. Thus, it is apparent that it would be advantageous to provide an alternative directed to overcoming one or more of the limitations set forth above Accordingly, a suitable alternative is provided including features more fully disclosed hereinafter.

SUMMARY OF THE INVENTION

The invention is a refrigerated mobile trailer that comprises a trailer body having an opening in both its front wall and roof for receiving a transportable refrigeration unit whose air outlets for discharging heated exhaust air are all located in the roof panel of the unit.

The housing of the refrigeration unit encloses a condenser assembly that includes a condenser coil, an air inlet disposed in a sidewall of the housing for receiving ambient air for circulation over the coil, and a blower for receiving ambient air from the inlet, circulating it over the condenser coil, and discharging it through the air outlet in the housing roof panel to remove heat radiated by the coil. The refrigeration unit includes a refrigerant compressor that may be powered by an internal combustion engine having a radiator. In such a case, the radiator of the engine is disposed adjacent to the condenser coil so that ambient air received from the air inlet and discharged by the blower simultaneously circulates through both the radiator and the condenser coil before being discharged through the air outlet. For maximum heat transfer, the sides of the radiator and condenser coil having the largest area are oriented parallel to and in alignment with the air outlet in the roof panel of the refrigeration unit. The rooftop location of the air outlets prevents air discharged therefrom from being recirculated through the air inlet located in the side panel of the refrigeration unit housing.

The transportable refrigeration unit may further have an evaporator blower centrally disposed in its housing, and the condenser coil may be divided into two sections located on either side of the roof panel of the unit. In such an arrangement, the roof panel includes two air outlets, each of which is disposed directly over the condenser coil sections and engine radiator in order to discharge waste heat carried by air circulated from a pair of blowers that are likewise mounted on either side of, and within the unit housing.

In addition to the aforementioned thermal advantages, the applicant has discovered that such an arrangement of components advantageously reduces the extension of the refrigeration unit beyond the front wall of the trailer body by between 10 and 20% while allowing for more room for larger, more optimally sized evaporator and condenser blowers. The resulting arrangement of components also advantageously minimizes rooftop coil intrusion into the trailer load space while optimizing condenser proportions for enhanced heat removal. The foregoing and other aspects will become apparent from the following detailed description of the invention when considered in conjunction with the accompanying drawing figures.

BRIEF DESCRIPTION OF THE SEVERAL FIGURES

DETAILED DESCRIPTION OF THE PREFERRED EMBODIMENT

Figure 1:
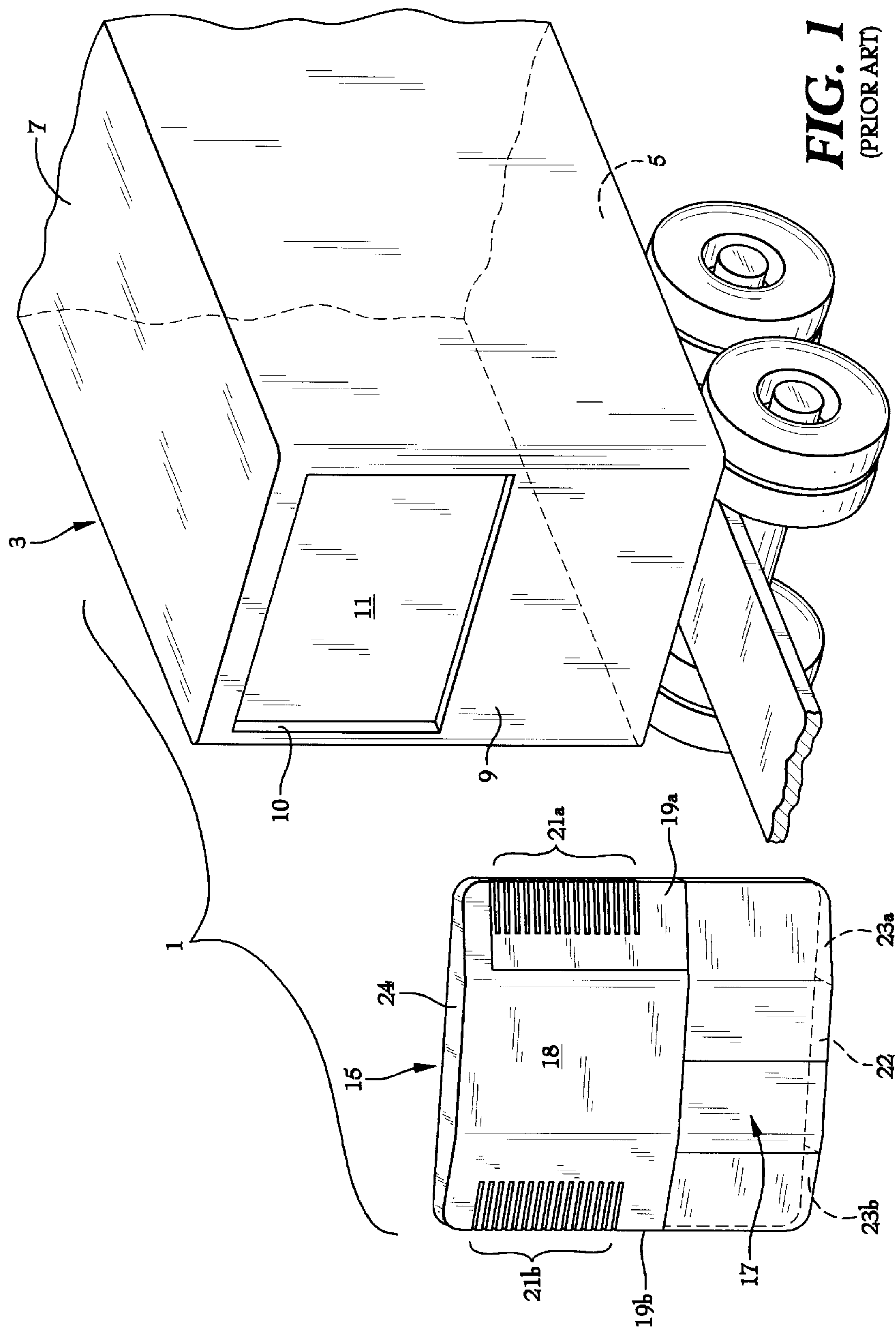
FIG. 1 is an exploded, perspective view of a prior art refrigerated mobile trailer.
Figure 2:
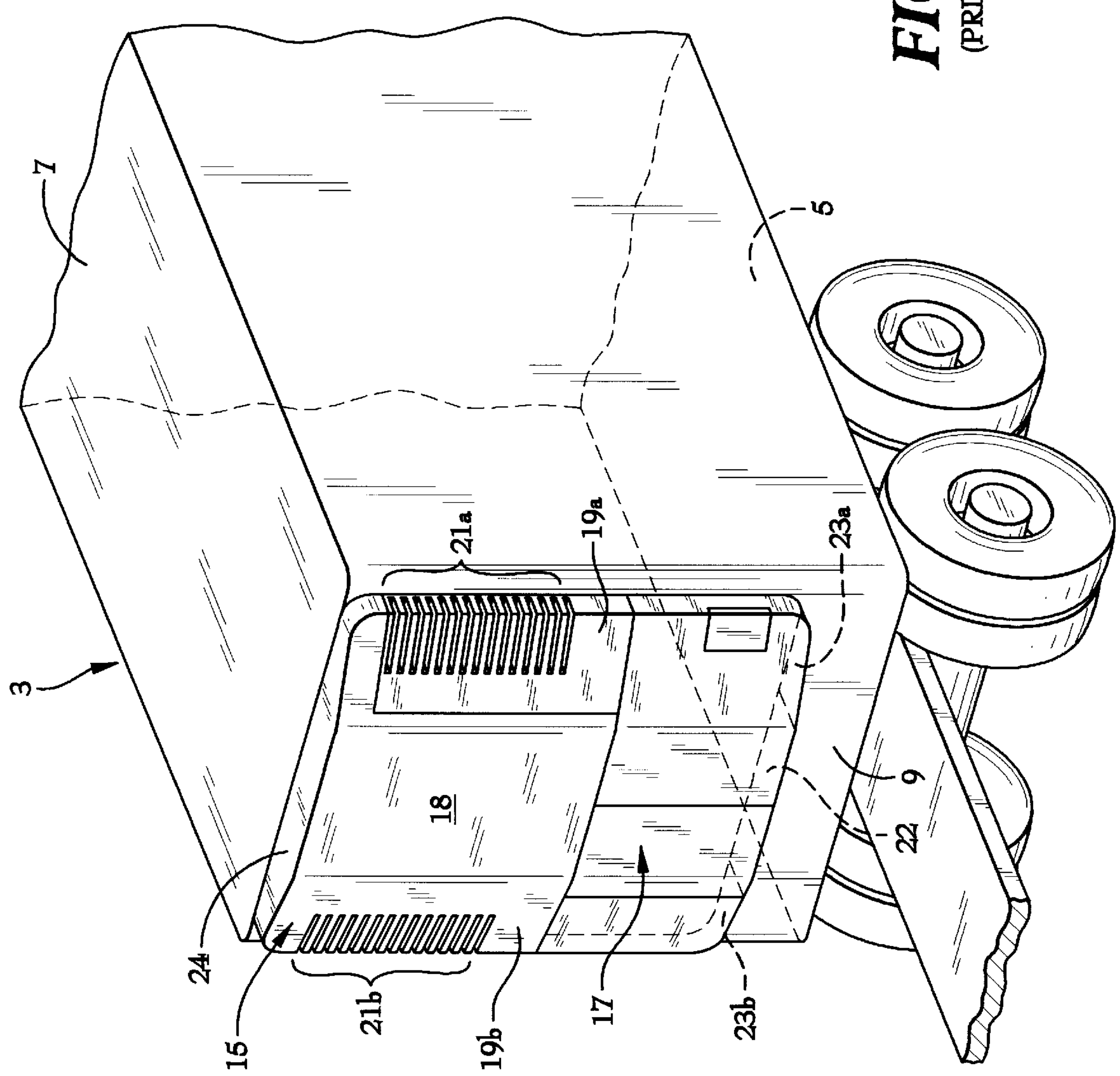
FIG. 2 is a perspective view of the refrigerated mobile trailer of FIG. 1 in assembled form.
Figure 3:
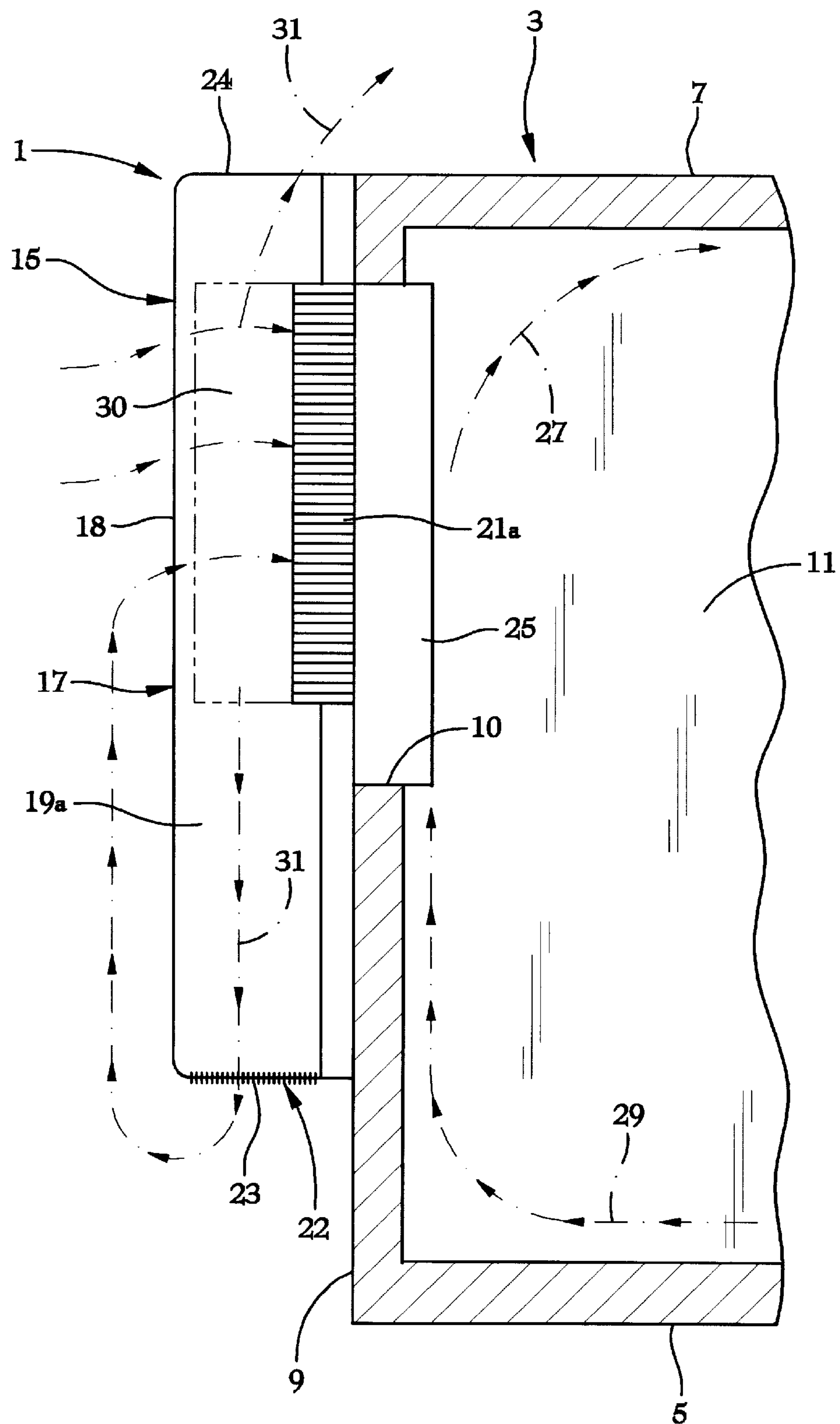
FIG. 3 is a partial, cross sectional side view of the refrigerated mobile trailer illustrated in FIG. 2, demonstrating how hot air discharged from the air outlets of the refrigeration unit can undesirably recirculate into the air inlets of the unit.

With reference now to FIGS. 1, 2, and 3, the invention is an improvement over prior art mobile refrigerated trailers 1 of the type generally comprising a trailer body 3, and a front-mounted transportable refrigeration unit 15. The body 3 of such trailers 1 is rectangular in shape, having a floor 5, a roof 7, and a front side panel 9. The front side panel 9 has a rectangular opening 10 in its upper portion for receiving the evaporator assembly 25 (shown in FIG. 3) of the unit 15. The interior 11 of the trailer body 3 defines a conditioned space that the refrigeration unit 15 maintains at a desired temperature set point. The transportable refrigeration unit 15 is formed from a housing 17 having a front panel 18 flanked by a pair of side panels 19*a,b*. Air inlet 21*a* and one of the air outlets 21*b* are located in the upper portions of each of the side panels 19*a,b*. The housing 17 further includes a trapezoidal shaped bottom panel 22 having an air outlets 23*a,b* and a trapezoidal shaped top panel 24 which may also have an air outlet (not shown). An evaporator assembly 25 (shown in FIG. 3) extends out of the back face of the refrigeration unit 15 into the conditioned space 11.

In operation, the evaporator assembly 25 discharges refrigerated air 27 along the ceiling of the trailer body 3, and continuously receives return air 29 along the floor of the body 3 in order to maintain the condition space 11 at a pre-selected temperature set point. Simultaneously, the refrigeration unit 15 receives ambient air through the air inlet 21*a* and circulates it through a condenser assembly 30, the coil of which is shown in phantom in FIG. 3. A blower (not shown) discharges the ambient air received through the inlet 21*a* over the heat exchanger coils indicated in phantom. Hot air 31 leaving the coil is discharged through the air outlets 21*b* and 23*a,b* located in the side panel 19*b* and bottom panel 22 of the housing 17. When the trailer 1 is in motion, the discharged hot air 31 from outlet 23*a,b* is swept laterally away along the side of the trailer body 3. However, when the trailer 1 is stationary (as it may be, for example, during a loading or unloading operation), the discharged hot air 31 from bottom panel outlet 23*a,b* can flow upwardly along the side panels 19*a* and become recirculated through the air inlet 21*a*. Because the discharged hot air 31 artificially increases the temperature of the ambient air, such recirculation from the outlet 23*a,b* to the inlet 21*a* can significantly impair the ability of the condenser assembly 30 to liquefy the refrigerant used in the refrigeration unit 15. In situations where the ambient air temperature is very high (for example, 120° F.) the recirculation of the discharged hot air 31 can prevent the refrigeration unit 15 from being used to maintain a desired temperature set point in the conditioned space 11.

Figure 4:
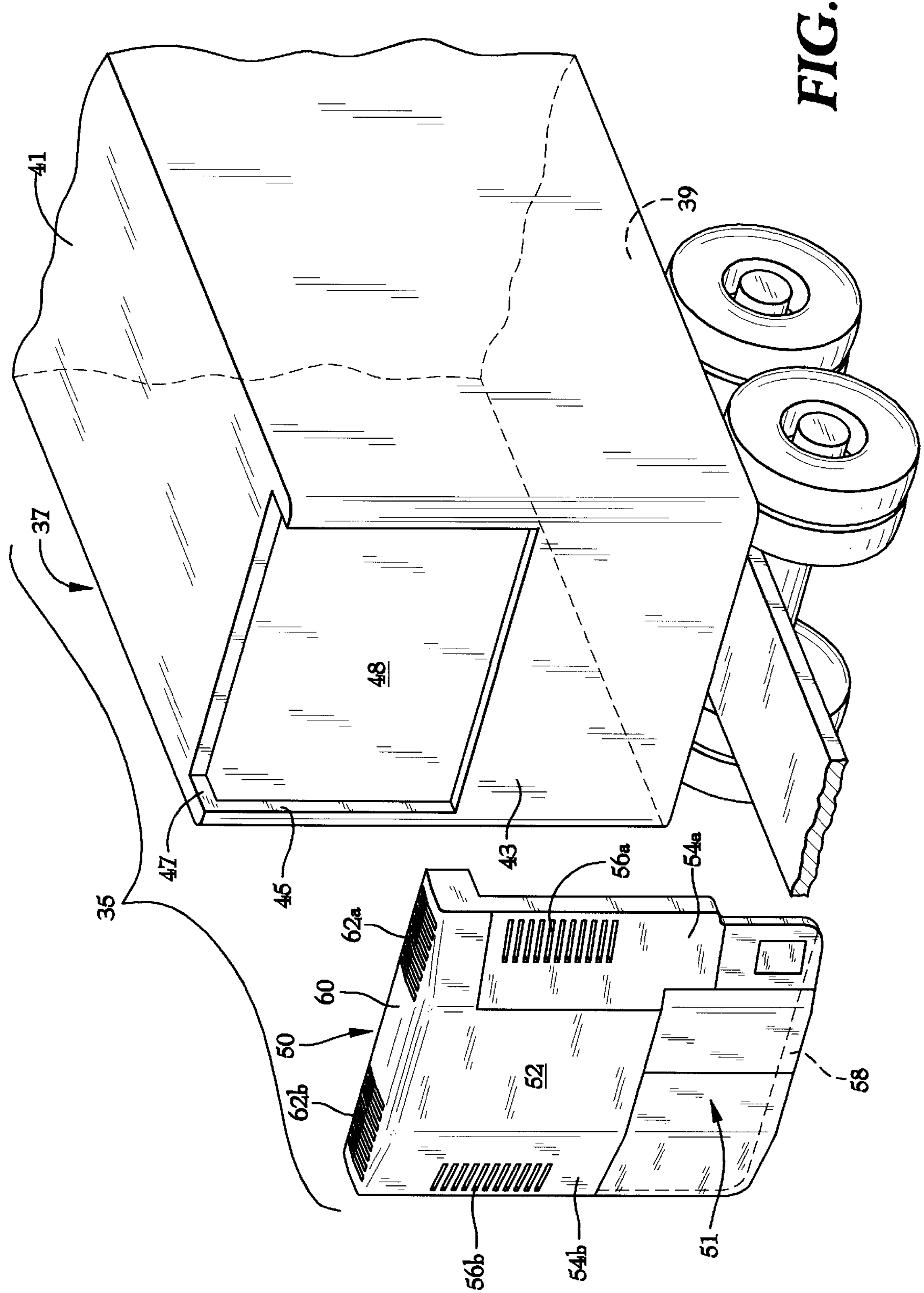
FIG. 4 is an exploded, perspective view of the refrigerated mobile trailer of the invention.
Figure 5:
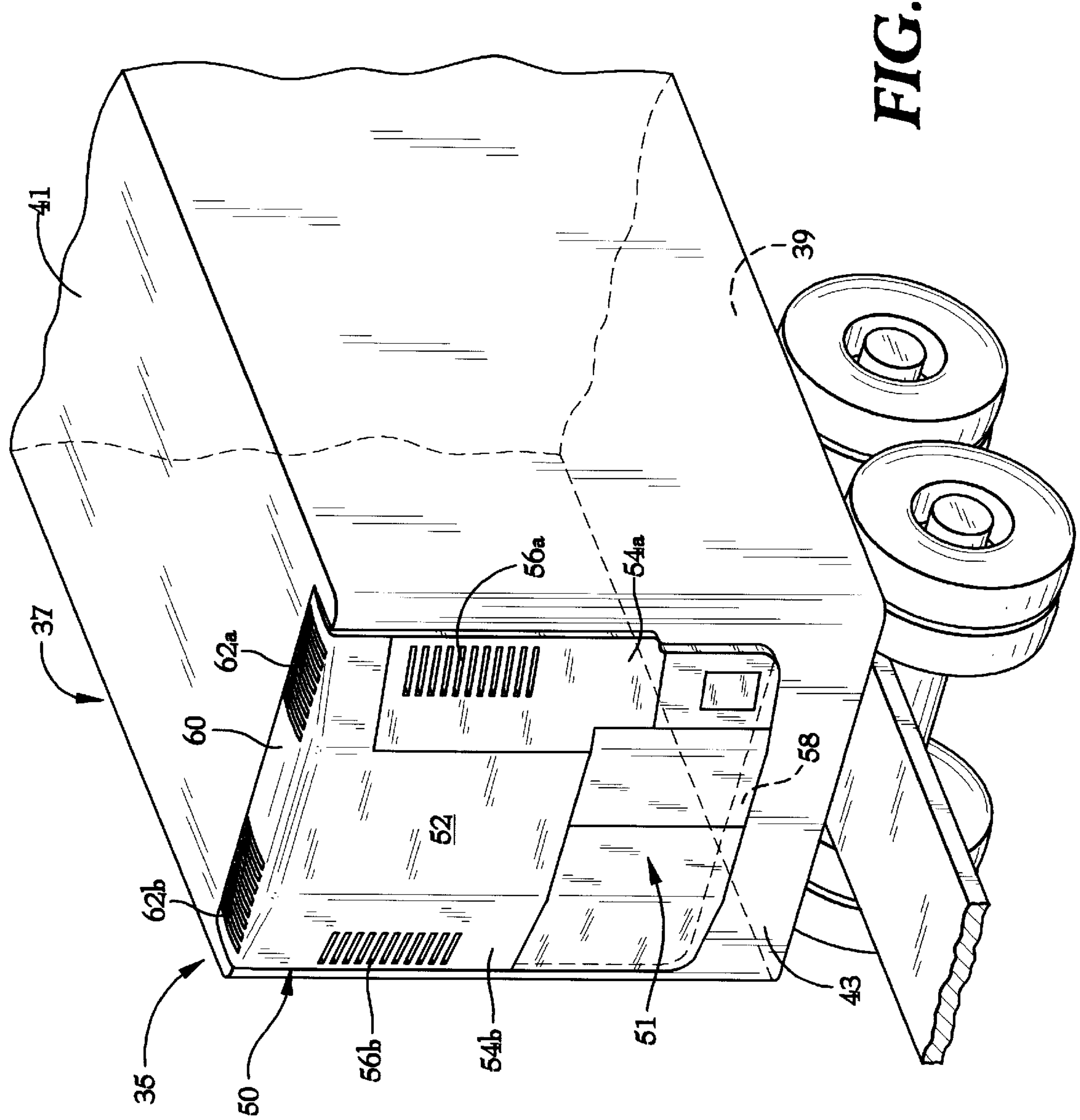
FIG. 5 illustrates the refrigerated mobile trailer of FIG. 4 in assembled form.
Figure 6:
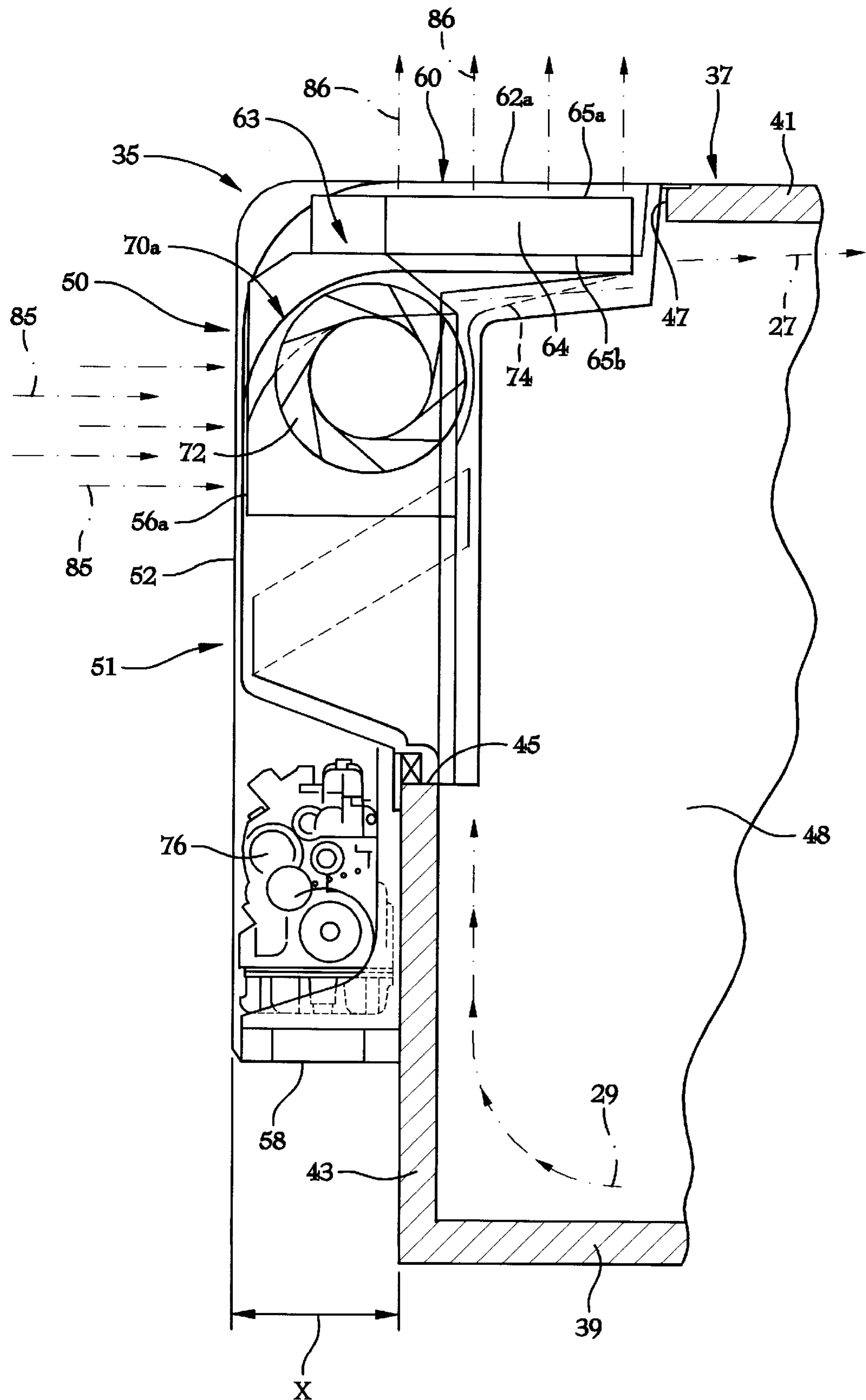
FIG. 6 is a partial, cross sectional side view of the refrigerated mobile trailer illustrated in FIG. 5, demonstrating how air received by the air inlets of the refrigeration unit is discharged through the roof panel of the unit.

With reference now to FIGS. 4, 5 and 6, the mobile refrigerated trailer 35 of the invention avoids the hot air recirculation problem described with respect to the prior art refrigerated trailer 1. Like the trailer body 3 of the prior art, the trailer body 37 of the invention has a floor 39, a roof 41, and a front side panel 43. However, the rectangular opening 45 located in the upper portion of front side panel 43 extends all the way to the upper edge of the panel 43. Additionally, the roof 41 includes a rectangular recess 47 that joins the rectangular opening 45 in the front side panel 43. A conditioned space 48 is defined within the walls of the trailer body 37.

The transportable refrigeration unit 50 of the trailer 35 includes a housing 51 formed from a front panel 52 flanked by a pair of side panels 54*a,b*. The side panels 54*a,b* each include air inlets 56*a,b* in their upper portions. The housing 51 further includes a trapezoidal shaped bottom panel 58 and roof panel 60. However, unlike the unit 15 used in connection with the prior art trailer 1, the air outlets 62*a,b* are provided on the roof panel 60, instead of the bottom panel 58. The roof panel 60 of the refrigeration unit 50 is also longer than the top panel 24 used in the prior art refrigeration unit 15, and is complimentary in shape to the rectangular recess 47 present in the roof 41 of the trailer body 37.

Figure 7:
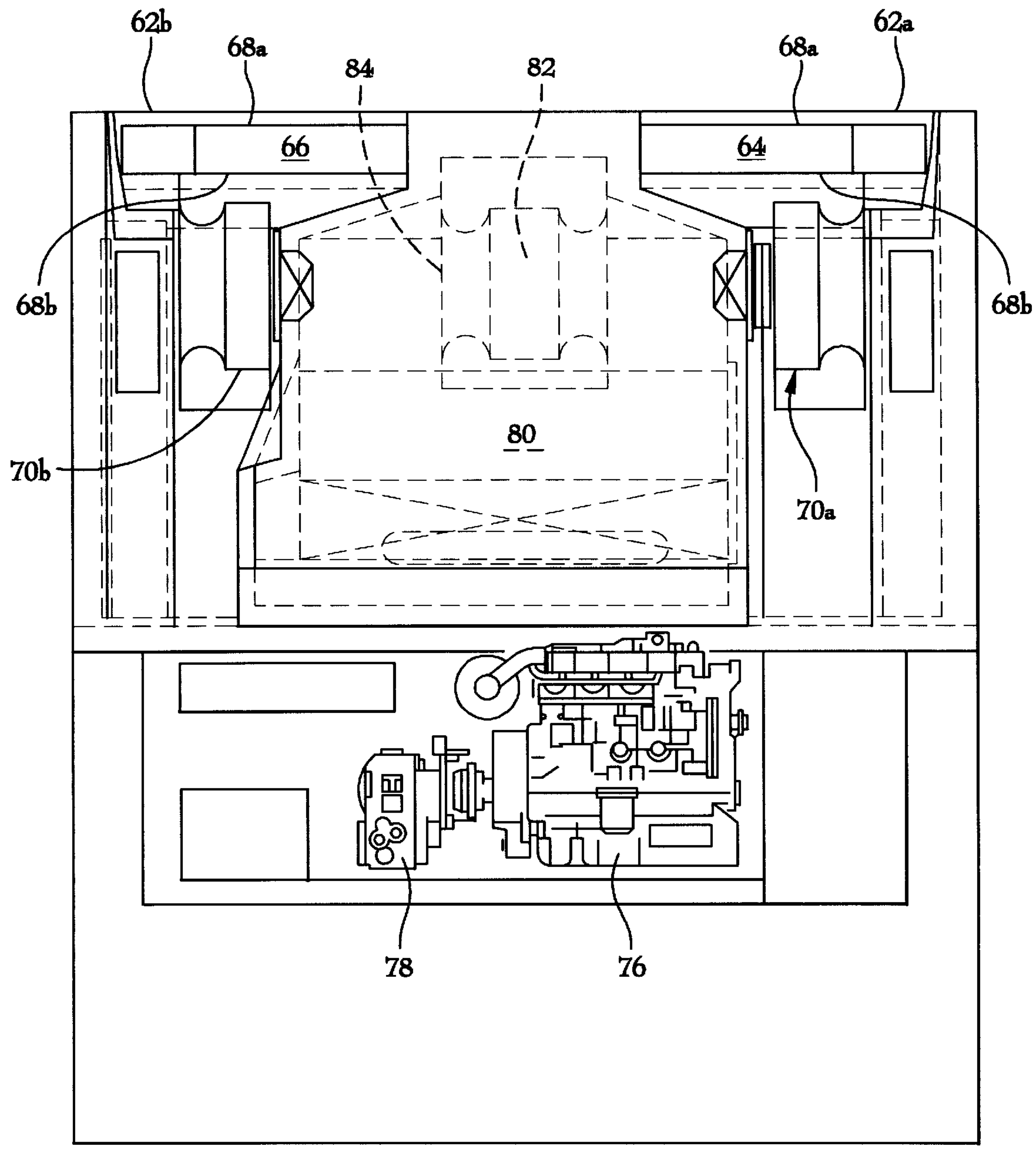
FIG. 7 is a front view of the refrigeration unit illustrated in FIG. 6 with the front and side panels of the unit housing removed to better show the arrangement of the condenser, radiator, and evaporator coils and blowers.
Figure 8:
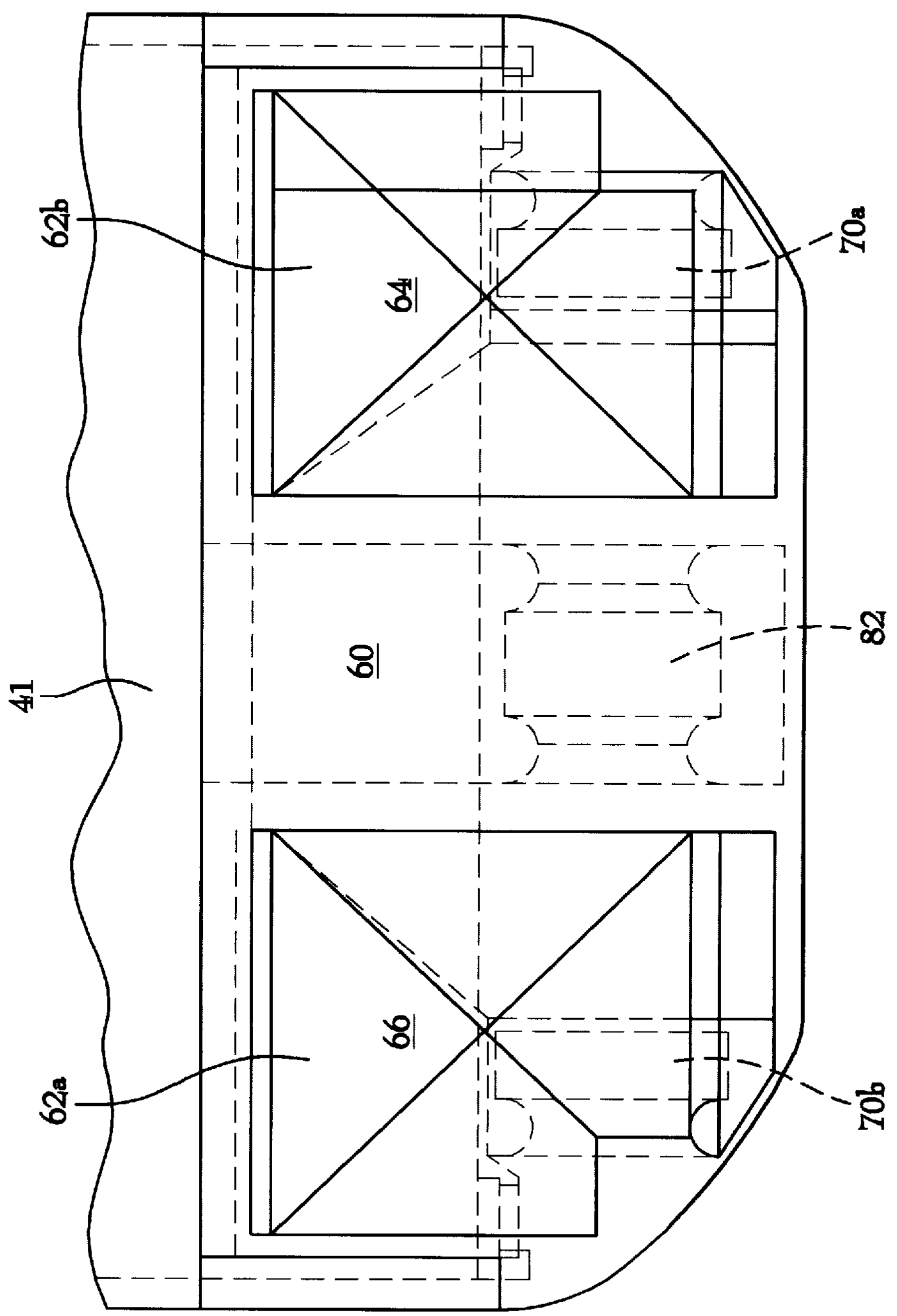
FIG. 8 is a top plan view of the refrigerated mobile trailer of the invention, illustrating the roof-mounted air outlets of the unit.

As is best seen in FIGS. 6, 7 and 8, the refrigeration unit 50 houses a condenser assembly 63 that includes condenser and radiator coils 64,66, and blowers 70*a,b*. The side walls 65*a,b* having the largest area of any of the walls of the coil 64 are disposed parallel to and in alignment with the air outlets 62*a* to facilitate heat transfer. Likewise, the largest side walls 68*a,b* of the condenser coil 66 are arranged parallel to and in alignment with the air outlet 62*b*. A pair of blowers 70*a,b,* each of which includes a single width, back inclined impeller 72, pull ambient air from the air inlets 56*a,b* and forcefully discharge it through the condenser and radiator coils 64 and 66, where it carries off waste heat through the air outlets 62*a,b*. Each of the blowers 70*a,b* includes a guide housing 74 for directing the previously-described circulation of air. The bottom portion of the refrigeration unit 50 houses an internal combustion engine

76 which powers a refrigerant compressor 78. The engine 76 has a radiator which forms part of the previously-described condenser and radiator coil 64. The back portion of the refrigeration unit 50 houses an evaporator assembly 80 having a double wide, back inclined impeller 82, and a guide housing 84 for directing the discharge of refrigerated air 27 along the ceiling of the trailer body 37, and the intake of return air 29 along the floor of the trailer body 37.

In operation, the blowers 70*a,b* of the condenser assembly 63 pull ambient air 85 through air inlets 56*a,b* located in the side panels 54*a,b* of the unit housing 51, and discharge ambient air through the sidewalls 65*a,b* and 68*a,b* of the condenser and radiator coil 64 and condenser coil 66. The heated discharged air 86 exits the unit housing 51 through the air outlets 62*a,b* in roof panel 60 where it cannot recirculate back through the air inlets 56*a,b* whether the trailer 35 is stationary or moving.

As a serendipitous consequence of the relocation of the condenser assembly blower 70*a,b* and coils 64,66 and an elongated, upper portion of the refrigeration unit 50, the applicants have noticed that there is now more useable space within the front portion of the unit housing 51 for other components of the refrigeration unit 50. This additional useable space may advantageously be used to reduce the front extent of X (shown in FIG. 6) of the refrigeration unit 50 with respect to the front side panel 43 by 17% or greater of the front extent dimensions of prior art refrigeration units.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

We claim:

1. A refrigerated mobile trailer, comprising:

a trailer body having a floor, a roof, and a front wall, the front wall having an opening for receiving a refrigeration unit;

a transportable refrigeration unit mounted over said front wall opening the transportable refrigeration unit including a housing having an upper portion, a roof panel and a side panel, wherein said trailer body roof includes a recess contiguous with said front wall opening for receiving the upper portion of said housing, and a condenser assembly disposed within said housing including a condenser coil, an air inlet for receiving ambient air for circulation over said coil, and at least one air outlet for discharging circulated air away from said coil, wherein all said air outlets are mounted on said roof panel of said housing for preventing air discharged from any of said air outlets from entering said air inlet.

2. The refrigerated mobile trailer as claimed in claim 1, wherein said recess receives a portion of said roof panel of said unit housing such that said trailer body roof and housing roof panel are integrated.

3. The refrigerated mobile trailer as claimed in claim 1, wherein said unit housing includes a side panel, and said air inlet is mounted on said side panel.

4. The refrigerated mobile trailer as claimed in claim 1, wherein said condenser coil is located adjacent to said air outlet.

5. The refrigerated mobile trailer as claimed in claim 4, wherein said transportable refrigeration unit includes an internal combustion engine having a radiator, and said internal combustion engine radiator is located adjacent to said air outlet.

6. The refrigerated mobile trailer as claimed in claim 4, wherein said condenser assembly further includes a blower for circulating air from said air inlet to said air outlet.

7. The refrigerated mobile trailer as claimed in claim 4, wherein said condenser coil includes first and second coil sections, said condenser assembly including first and second air outlets mounted on said roof panel adjacent to said first and second coil sections.

8. The refrigerated mobile trailer as claimed in claim 4, wherein the side of said condenser coil having the largest area is disposed over said air outlet to maximize air flow through said condenser coil.

9. The refrigerated mobile trailer as claimed in claim 6, wherein said blower includes a single width, backward inclined impeller.

10. A refrigerated mobile trailer, comprising:

a trailer body having a floor, a front wall with an opening extending down from a top edge thereof, and a roof having a recess contiguous with said opening of said front wall;

a transportable refrigeration unit mounted over said front wall opening and in said trailer roof recess, said unit including a housing having a roof panel and a side panel, and a condenser assembly disposed within said housing, said condenser assembly including a condenser coil, an air inlet for receiving ambient air for circulation over said coil, and at least one air outlet for discharging circulated air away from said coil, wherein said air inlet and all of said air outlets are mounted on said side and roof panels of said unit housing, respectively, for preventing air discharged from any of said air outlets from entering said air inlet when said trailer is stationary and for increasing the amount of useable space within the unit housing.

11. The refrigerated mobile trailer as claimed in claim 10, wherein said condenser coil is located adjacent to said air outlet, and wherein the side of said coil having the largest area is disposed over said air outlet to maximize air flow through said condenser coil.

12. The refrigerated mobile trailer as claimed in claim 11, wherein said transportable refrigeration unit includes an internal combustion engine having a radiator for turning a refrigerant compressor, and said internal combustion engine radiator is likewise located adjacent to said air outlet.

13. The refrigerated mobile trailer as claimed in claim 11, wherein said condenser coil includes first and second coil sections, and said condenser assembly includes first and second air outlets mounted on said roof panel adjacent to said first and second coil sections.

14. The refrigerated mobile trailer as claimed in claim 13, wherein said refrigeration unit further includes an evaporator blower centrally disposed within said housing, and said first and second air inlets are located on either side of said evaporator blower.

15. The refrigerated mobile trailer as claimed in claim 14, wherein the condenser assembly includes first and second blowers for circulating air over said first and second condenser coil sections.

16. A refrigerated mobile trailer, comprising:

a trailer body having a floor, a front wall with an opening extending down from a top edge thereof, and a roof having a recess contiguous with said opening of said front wall;

a transportable refrigeration unit mounted over said front wall opening and in said trailer roof recess, said unit including a housing having a roof panel and a side panel, and a condenser assembly disposed within said housing, said condenser assembly including a condenser coil, an air inlet for receiving ambient air for circulation over said coil, and at least one air outlet for discharging circulated air away from said coil, an internal combustion engine for powering a refrigerant compressor, said engine having a radiator;

wherein said air inlet and all of said air outlets are mounted on said side and roof panels of said unit housing, respectively, for preventing air discharged from any of said air outlets from entering said air inlet when said trailer is stationary, and said condenser coil and radiator of said engine is mounted adjacent to said air outlet.

17. The refrigerated mobile trailer as claimed in claim 16, wherein said condenser coil includes first and second coil sections, and said condenser assembly includes first and second air outlets mounted on said roof panel adjacent to said first and second coil sections.

18. The refrigerated mobile trailer as claimed in claim 16, wherein the side of said condenser coil having the largest area is disposed over said air outlet to maximize air flow through said condenser coil.

19. The refrigerated mobile trailer as claimed in claim 16, wherein said condenser assembly further includes a blower for circulating air from said air inlet to said air outlet.

* * * * *